US010366642B2

(12) United States Patent
Reichow et al.

(10) Patent No.: US 10,366,642 B2
(45) Date of Patent: Jul. 30, 2019

(54) INTERACTIVE MULTIPLANE DISPLAY SYSTEM WITH TRANSPARENT TRANSMISSIVE LAYERS

(71) Applicant: DISNEY ENTERPRISES, INC., Burbank, CA (US)

(72) Inventors: Mark A. Reichow, Glendale, CA (US); John David Smith, Burbank, CA (US); Jonathan Ackley, Glendale, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 99 days.

(21) Appl. No.: 15/366,634

(22) Filed: Dec. 1, 2016

(65) Prior Publication Data
US 2018/0158385 A1 Jun. 7, 2018

(51) Int. Cl.
| | |
|---|---|
| *G06F 3/03* | (2006.01) |
| *A63F 13/2145* | (2014.01) |
| *G09G 3/00* | (2006.01) |
| *G06F 3/0488* | (2013.01) |
| *G06F 3/0481* | (2013.01) |
| *G06F 3/0484* | (2013.01) |
| *A63F 13/26* | (2014.01) |

(52) U.S. Cl.
CPC ......... *G09G 3/003* (2013.01); *A63F 13/2145* (2014.09); *G06F 3/0304* (2013.01); *G06F 3/0488* (2013.01); *G06F 3/04815* (2013.01); *G06F 3/04842* (2013.01); *A63F 13/26* (2014.09); *G09G 2300/023* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 7,515,143 B2* | 4/2009 | Keam | G06F 3/0421 |
| | | | 178/18.01 |
| 2002/0105516 A1* | 8/2002 | Tracy | G06T 15/40 |
| | | | 345/419 |
| 2009/0268016 A1* | 10/2009 | Hasegawa | G02B 27/2278 |
| | | | 348/51 |

(Continued)

*Primary Examiner* — Kent W Chang
*Assistant Examiner* — Benjamin Morales
(74) *Attorney, Agent, or Firm* — Marsh Fischmann & Breyfogle LLP; Kent A. Lembke (57) ABSTRACT

A multiplane display system that includes two or more display devices provided at two or more layers. One or more of these display devices is a transparent transmissive display device. Foreground or first layer content is generated for and displayed by a first transparent transmissive display device while background content is generated for and displayed by a second display device, which is in a spaced apart plane or layer that is behind the plane or layer of the first display device. In some embodiments, the two layers of content are pre-generated and played back to provide 3D or multiplane imagery or an interactivity assembly can be provided to sense user input and, in response, to generate new or modified content (media) for the first and/or second transparent transmissive display devices. Each of the transparent transmissive display devices or layer may be a transparent organic light emitted diode (tOLED) display device.

16 Claims, 7 Drawing Sheets

(56) References Cited

U.S. PATENT DOCUMENTS

| | | | |
|---|---|---|---|
| 2011/0037836 A1* | 2/2011 | Chang | H04N 13/0493 348/52 |
| 2011/0084893 A1* | 4/2011 | Lee | G06F 1/1649 345/6 |
| 2011/0249026 A1* | 10/2011 | Singh | G09G 3/003 345/630 |
| 2012/0033298 A1* | 2/2012 | Hsiao | G02B 27/0093 359/462 |
| 2012/0057006 A1* | 3/2012 | Joseph | H04N 13/0402 348/59 |
| 2012/0060089 A1* | 3/2012 | Heo | G06F 1/1647 715/702 |
| 2012/0139956 A1 | 6/2012 | Joseph, et al. | |
| 2012/0188637 A1 | 7/2012 | Joseph et al. | |
| 2012/0243087 A1* | 9/2012 | Lu | G02B 27/26 359/478 |
| 2013/0082905 A1 | 4/2013 | Ranieri, et al. | |
| 2013/0300728 A1 | 11/2013 | Reichow, et al. | |
| 2014/0035942 A1* | 2/2014 | Yun | G09G 5/006 345/592 |
| 2014/0118336 A1 | 5/2014 | Smithwick | |
| 2014/0168051 A1 | 6/2014 | Smoot, et al. | |
| 2014/0192281 A1 | 7/2014 | Smithwick, et al. | |
| 2015/0062175 A1* | 3/2015 | Kim | G09G 3/3648 345/639 |
| 2016/0240118 A1* | 8/2016 | Ray | G02B 27/225 |

* cited by examiner

INTERACTIVE MULTIPLANE DISPLAY SYSTEM WITH TRANSPARENT TRANSMISSIVE LAYERS

BACKGROUND

1. Field of the Description

The present description relates, in general, to display systems adapted for stereoscopic or three dimensional (3D) image generation, and, more particularly, to systems and methods for producing 3D images or depth and space media illusions without requiring viewers to wear 3D glasses or the like. These display systems may be considered multiplane display systems providing a 3D display to viewers, rather than using projected images requiring a viewing technology such as particular glasses to be properly viewed, and the display systems may be configured to provide interactivity with viewers/users of the display systems.

2. Relevant Background

There is a growing demand for displays that include 3D imagery. For example, there is a growing trend toward using 3D projection techniques in theatres and in home entertainment systems including video games and computer-based displays. In many conventional 3D projection techniques, the right eye and the left eye images are delivered separately to display the same scene or images from separate perspectives so that a viewer sees a three dimensional composite, e.g., certain characters or objects appear nearer than the screen and other appear farther away than the screen. Stereoscopy, stereoscopic imaging, and 3D imaging are labels for any technique capable of creating the illusion of depth in an image. Often, the illusion of depth in a photograph, movie, or other two-dimensional image is created by presenting a slightly different image to each eye or the creation of parallax. In most animated 3D projection systems, depth perception in the brain is achieved by providing two different images to the viewer's eyes representing two perspectives of the same object with a minor deviation similar to the perspectives that both eyes naturally receive in binocular vision.

The images or image frames used to produce such a 3D output are often called stereoscopic images or a stereoscopic image stream because the 3D effect is due to stereoscopic perception by the viewer. A frame is a single image at a specific point in time, and motion or animation is achieved by showing many frames per second (fps) such as 24 to 30 fps. The frames may include images or content from a live action movie filmed with two cameras or a rendered animation that is imaged or filmed with two camera locations. Stereoscopic perception results from the presentation of two horizontally offset images or frames with one or more object slightly offset to the viewer's left and right eyes, e.g., a left eye image stream and a right eye image stream of the same object. The amount of offset between the elements of left and right eye images determines the depth at which the elements are perceived in the resulting stereo image. An object appears to protrude toward the observer and away from the neutral plane or screen when the position or coordinates of the left eye image are crossed with those of the right eye image (e.g., negative parallax). In contrast, an object appears to recede or be behind the screen when the position or coordinates of the left eye image and the right image are not crossed (e.g., a positive parallax results).

Many techniques have been devised and developed for projecting stereoscopic images to achieve a 3D effect. One technique is to provide left and right eye images for a single, offset two-dimensional image and displaying them alternately, e.g., using 3D switching or similar devices. A viewer is provided with liquid crystal shuttered spectacles to view the left and the right eye images. The shuttered spectacles are synchronized with the display signal to admit a corresponding image one eye at a time. More specifically, the shutter for the right eye is opened when the right eye image is displayed and the liquid crystal shutter for the left eye is opened when the left eye image is displayed. In this way, the observer's brain merges or fuses the left and right eye images to create the perception of depth.

Another technique for providing stereoscopic viewing is the use of anaglyphs. An anaglyph is an image generally consisting of two distinctly colored, and preferably, complementary colored, images. The theory of anaglyph is the same as the technique described above in which the observer is provided separate left and right eye images, and the horizontal offset in the images provides the illusion of depth. The observer views the anaglyph consisting of two images of the same object in two different colors, such as red and blue-green, and shifted horizontally. The observer wearing anaglyph spectacles views the images through lenses of matching colors. In this manner, the observer sees, for example, only the blue-green tinted image with the blue-green lens, and only the red tinted image with the red lens, thus providing separate images to each eye. The advantages of this implementation are that the cost of anaglyph spectacles is lower than that of liquid crystal shuttered spectacles and there is no need for providing an external signal to synchronize the anaglyph spectacles.

In other 3D projection systems, the viewer may be provided glasses with appropriate polarizing filters such that the alternating right-left eye images are seen with the appropriate eye based on the displayed stereoscopic images having appropriate polarization (two images are superimposed on a screen, such as a silver screen to preserve polarization, through orthogonal polarizing filters). Other devices have been produced in which the images are provided to the viewer concurrently with a right eye image stream provided to the right eye and a left eye image stream provided to the left eye. Still other devices produce an auto-stereoscopic display via stereoscopic conversion from an input color image and a disparity map, which typically is created based on offset right and left eye images. While these display or projection systems may differ, each typically requires a stereographic image as input in which a left eye image and a slightly offset right eye image of a single scene from offset cameras or differing perspectives are provided to create a presentation with the appearance of depth.

There is a continuous desire and need to provide new techniques that provide cost effective but eye-catching content with depth and dimension. For example, it is desirable to grab the attention of crowds in shopping malls, on busy streets, in amusement parks, and other crowded facilities such as airports and entertainment arenas, and there is an ongoing demand to improve 3D imagery in other settings including education, medicine, and gaming. As discussed above, 3D imagery is one exciting way to appeal to viewers and hold their attention. However, the use of 3D imagery has, in the past, been limited by a number of issues. Typically, 3D projection is used only in low light environments and is not particularly effective in applications where there is a significant amount of ambient light such as an outdoor venue during the daytime (e.g., an amusement park or athletic stadium in the morning or afternoon where conventional 3D video image projection cannot compete with sunlight). Further, 3D projection technologies generally require the viewer to wear special viewing glasses, which is often inconvenient for many applications and can significantly add to costs.

To eliminate the need for 3D glasses and projection technologies, display systems have been created to provide 3D imagery using two or more planar display devices, and these display devices are labeled or described as multiplane displays. Multiplane displays, particularly multiplane table top displays, have required at least one display layer that has a transparent operating mode. This layer has typically been provided by or made by use of a transparent liquid crystal display (LCD) device as a front or outer layer, which is then driven by a super bright, non-transparent LCD (e.g., up to or over 1500 nits) as a back layer in the display. The opacity of the polarizers in the "transparent" LCD make this display system hard to implement and use. Particularly, multiplane displays with LCD devices have only had limited use or application because of the light loss in the one or more LCD layers (i.e., as backlighting is absorbed or blocked by the LCD device). Additionally, it has proven difficult to create media (e.g., video content) for these LCD-based multiplane display systems.

SUMMARY

The inventors discovered that a multiplane display system can be designed and operated that includes two or more display devices provided at two or more layers, and each of these display devices can take the form of a transparent transmissive display device or layer. Foreground or first layer content (or media) can be generated for and displayed by a first transparent transmissive display device while background or second layer content (or media) can be generated for and displayed by a second transparent transmissive display device, which is in a spaced apart plane or layer that is behind the plane or layer of the first display device (e.g., below in a table-type display system, behind in a hanging or wall-mounted (or vertical) display system, above in a ceiling-mounted display system, and the like). In some embodiments, the two layers of content are pre-generated and simply played back to provide 3D or multiplane imagery while in other embodiments an interactivity assembly is provided to sense user input (e.g., relative to the first or outer layer or a touchscreen over this first/outer layer) and, in response, to generate new or modified content (media) for the first and/or second transparent transmissive display devices.

In some preferred embodiments, each of the transparent transmissive display devices or layers is provided in the form of a transparent organic light emitted diode (tOLED) display. In brief, unlike LCD displays, black or dark content displayed on a tOLED display device is clear while white and other bright content is opaque, and tOLED display devices are unique in that they are both transparent and emissive when the lighting value behind the transparent layer is adjusted to accommodate the desired result. If it is desired for the front or top layer to appear transparent, the back layer can be brighter, and when it is desired for the front or top layer to be opaque, the back layer may be controlled to be dimmer than the image or light from the front or top layer. With a tOLED display device, black areas are rendered as transparent with all pixels off in these areas. Hence, the areas of the first or outer display device (or devices if three or more layers are provided in a display system) that have black content/media provide transparent areas or windows to the second or background device (or devices) so that content/media displayed on the second or background device (i.e., background or lower layer content/media) can be observed concurrently with first or foreground layer content in the non-transparent or opaque (translucent-to-opaque) areas of the first or outer display device (i.e., areas used to display white or bright content (e.g., colors made by red, green, blue sub-pixel combinations) rather than black).

The interactivity assembly may sense user input such as touching a point on or near the first or foreground display device's screen. While the response to sensed interaction may vary widely to practice the display systems of the present description, the interactivity assembly (e.g., a game engine or the like) generally is configured to respond by modifying the content provided to the first and/or second display device. For example, content or media for the first or foreground display device may be modified or generated so as to create a transparent viewing window or portal to the content/media currently being displayed by the second or background display device. This may involve creating an area of black content/media proximate to the sensed contact point between the user and a touchscreen (or the outer surface or a protective cover for such display surface), e.g., a circle of predefined or user-defined diameter with a center at the sensed contact or touch point. The interacting viewer or user of the display system will be able to view the content/media being displayed by the second or background display device through this newly created or opened window/portal.

In another example, a portion of the content/media previously displayed by the second or background display device may be selected by the user's interaction and, in response, the content/media fed to the first or foreground display device may be generated or modified to bring this selected portion up into the foreground layer/plane of the displayed imagery. In still another example, the content/media provided in second layer of the imagery by the second or background display device may be moved to the first layer of the imagery by playing it back or displaying it with the first or foreground display device, and a new or "deeper" layer of content/media may be retrieved and/or generated for play back or display with the second or background display device for concurrent viewing through black areas/portions of the first/foreground content/media on the first or foreground display device.

More particularly, an apparatus is provided for generating a multiplane display (or 3D imagery). The apparatus includes a foreground display device with a display screen and also includes a background display device with a display screen spaced-apart a distance from the display screen of the foreground display device. The apparatus further includes an interactivity assembly sensing user interaction with the apparatus. A controller is provided that operates (such as with software and hardware) the foreground display device to display foreground content on the display screen of the foreground display device and operates the background display device to display background content on the display screen of the background display device. During these operations, at least one of the foreground content and the background content is selected, generated, or modified by the controller based on the sensed user interaction. Further, the display screen of the foreground display device includes at least one area that is transparent, whereby a viewing window is provided in the foreground display device for viewing a portion of the background content displayed on the display screen of the background display device.

In some embodiments, the foreground display device includes a transparent organic light emitting diode (tOLED) display device. The background display device may also be a tOLED display device or may take the form of an OLED display device or a liquid crystal display (LCD) device. When the foreground display device is a tOLED device, the area that is transparent corresponds to a set of black content in the foreground content, and the foreground content typically also includes bright content generating one or more opaque areas on the display screen of the foreground display device.

In some cases, the foreground content and the background content are generated by a game engine (e.g., a software (and/or hardware) provided in the controller). The game engine generates the foreground content using a first camera with a first point of view (POV) setting and generates the background content using a second camera with a second POV setting differing from the first POV setting. During operations in response to the sensing of the user interaction, the controller/game engine may modify the foreground content to create a transparent viewing window through which light from the display screen of the background display device passes through the foreground display device.

The interactivity assembly may include a transparent touchscreen positioned adjacent and parallel to the display screen of the foreground display device. In this or other implementations, the display screens are planar and parallel and are spaced apart a distance in the range of 1 to 18 inches. The apparatus may also include a position adjustment assembly operating to adjust the distance that the display screens are spaced apart during the operating of the foreground and background display devices by the controller (e.g., adjust location of one or more display screens to modify the depth at which certain content is presented such as in response to user input sensed by the interactivity assembly).

DETAILED DESCRIPTION OF THE PREFERRED EMBODIMENTS

Briefly, embodiments described herein are directed toward three dimensional (3D) display devices or systems that are autostereoscopic, as a viewer may perceive depth or the 3D effects in the displayed image without the use of 3D glasses or eyewear (e.g., no need for colored or switching lenses or the like). The 3D display devices described may be thought of as multiplane devices or systems as a typical embodiment will include a first or foreground display device (such as a planar tOLED or other transparent transmissive display device) that is used to display foreground (and/or intermediate-depth images if three or more planes/layers are provided) and a second or background display device (e.g., a second planar tOLED). A controller is provided in the display system to selectively operate each of the display devices such as to concurrently display foreground and background content/media with the foreground and background display device, respectively, and the foreground content/media typically will always or at least periodically include black areas so that the first or foreground display device has transparent or clear (which may mean transparent-to-translucent to light from the background display device) areas or viewing windows/portals to allow light emitted from the second or background display device (or background or second content/media) to be viewed/received by a viewer/user of the display system concurrently with light from the foreground or first display device (or foreground or first content/media). In this way, a 3D or multiplane display is achieved with the new display system in a new and highly effective manner.

The display surfaces of each of these display devices are spaced apart (e.g., 1 to 12 inches or more spacing) and typically arranged to be in parallel planes (multiple display planes). Two-dimensional (2D) images or content (still or video) is provided on each of the foreground and (in some cases) intermediate display devices as well as on the background display device, and the foreground and intermediate display devices are at least partially translucent to transparent such that the imagery (e.g., 2D imagery) presented on the intermediate and background display elements are concurrently visible to a viewer. In other words, a viewer's eyes concurrently receive light from all of the display devices (or their display surfaces) so as to perceive a 3D image with two or more depths or layers (associated with the planes).

In some embodiments, the depth effect or illusion is further enhanced, e.g., by the controller controlling the two (or more transparent and transmissive display devices) by handing off media between the planes or display surfaces, and, in some embodiments, the controller or control system functions to synchronize changes in the displayed 2D content of the display elements to move 2D content from one display element to another. For example, an animated character or a video of a live character may first be displayed in the background display element and then "move" to the foreground display elements, which, to a viewer, seems to fill in the space between the planes/layers containing the two or more display devices as the character is "present" in their mind between the planes during the rapid layer/plane transitions or movements (e.g., the human brain perceives the character also at the intervening depths or planes between display devices (or display layers/planes)).

In one design prototype, the inventors created a 3D or multiplane display system with a form factor of a multiplane table display. In this prototype or embodiment, the display system included a conventional display device providing the background content (e.g., an LCD device, an OLED device, or the like) that was visible through a foreground or first display device in the form of an emissive tOLED display device (while a second tOLED may be used in other embodiments to provide intermediate content/media with this second tOLED display device being positioned between the background display device and the foreground display device, with each being spaced apart some distance (e.g., 1 to 12 inches or more)). Particularly, the background content on the LCD, OLED, or similar display device was visible through black (and/or less bright) content that appeared transparent/clear to a viewer and provided viewing windows/portals to the background or lower display device(s).

Unlike previous display systems with an LCD display device, the background display device in this display system is not serving as a backlight for the transparent transmissive display device of the upper or foreground layer(s). Testing has shown that two or more tOLED display devices may be arranged in spaced-apart layers to create interesting table displays, and the prototyped display system showed to the inventors that even a single tOLED display device is useful in combination with another display device as the background display device as it exhibits remarkable depth and parallax in a relatively small package (e.g., allowing the table display to be relatively compact and shallow if desired).

The display system was also designed to include an interactivity assembly, and the prototyped display system utilized a conventional (off-the-shelf) touch screen (hardware and associated control software) to provide touch-based interactivity on a screen/surface covering the foreground display device. The controller may then run or include one or more game engines or similar components to dynamically generate content or modify content displayed on one or more of the display devices in response to sensed interaction by a viewer/user of the display system. In some embodiments, one or more of the display devices is repositionable during operation of the display system to vary its planar location relative to the table top (e.g., touch screen) so that the location of the displayed content can be dynamically varied (e.g., to vary separation between the two (or more) display layers) to support depth that changes during playback or content display.

The content displayed in the prototype display system was coordinated with the display capabilities by, for example, scaling the background and foreground images to reinforce the depth perception by the viewer/user. In one embodiment, the media/content generator of the smart table or display system was a game engine (e.g., a Unity game engine available from Unity Technologies or the like). A display designer is able with this type of media/content generator to build a digital volumetric world and choose camera planes (two in the prototyped version of the display system) to view the media from and for defining what is displayed on each of the display devices (or on each layer or plane of the table display system). Changing the camera perspectives via game engine settings/defined parameters, along with moving the physical location of the planes (via movement of the background and/or foreground display devices along its Z-axis), allows the display designer to create a unique volumetric or 3D display that immerses the viewer/user in an experience that the inventors believe is unique and differs significantly from existing display technologies.

Figure 1:
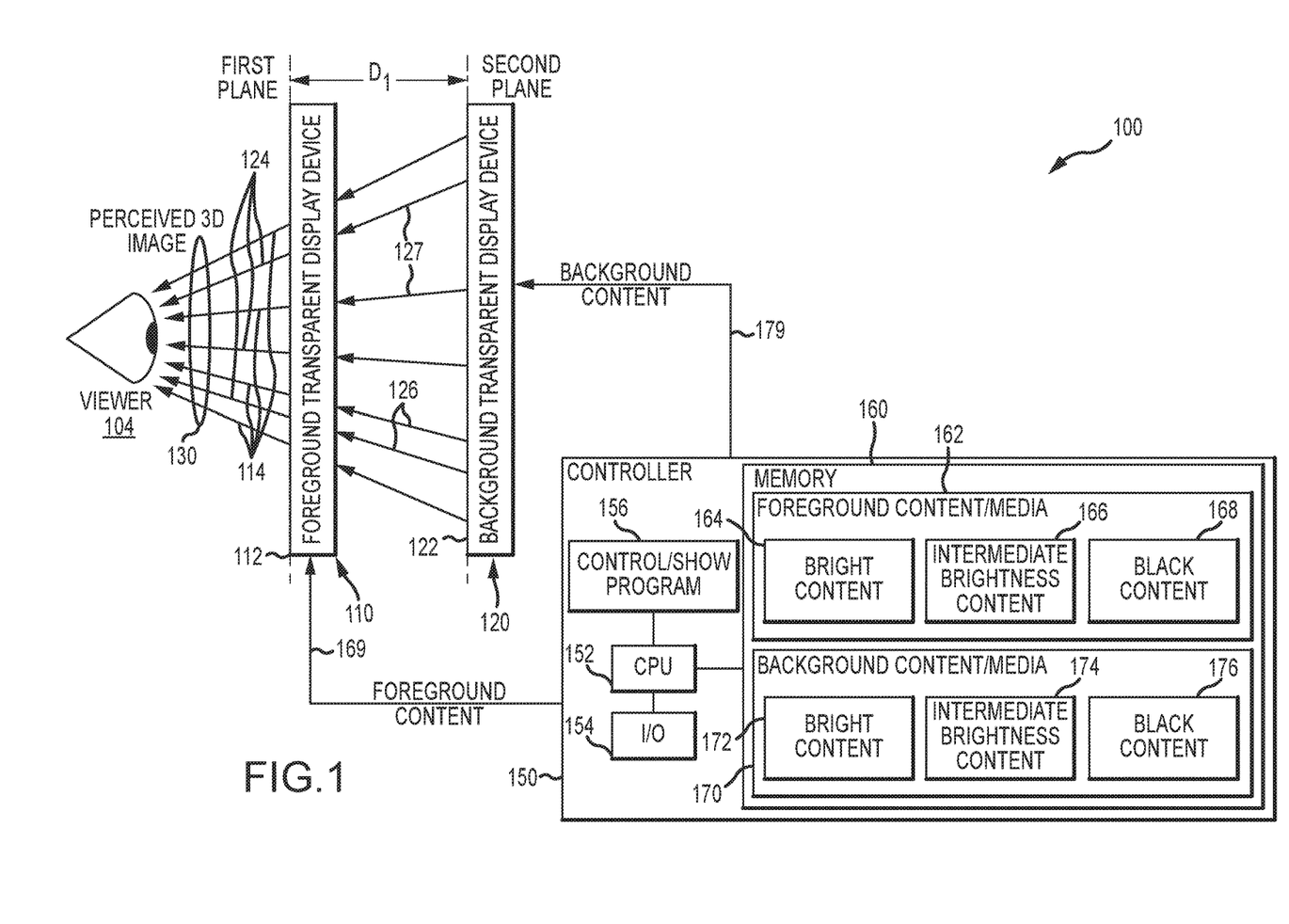
FIG. 1 illustrates a side view of a 3D or multiplane display system of one embodiment that includes a foreground and a background transparent display device operated to concurrently display two sets of content (e.g., 2D video or similar media) on spaced apart but concurrently viewable display surfaces or viewing planes.

FIG. 1 illustrates a side functional block view of a 3D or multiplane display system 100 of one embodiment of the present description. The display system 100 includes a foreground transparent (and transmissive) display device 110 and a background transparent (and transmissive) display device 120 operated (e.g., by controller 150) to concurrently display two sets of content (e.g., 2D video or similar media) on spaced apart but concurrently viewable display surfaces or viewing planes 112, 122 (or display device screens). The two planar display surfaces or planes 112, 122 are arranged to be parallel in this example and spaced apart a distance, Di, such as 0.5 to several inches with a separation range of 1 to 18 inches or more being useful in some embodiments to provide a desired depth effect. In practice, the display devices 110, 120 may be arranged vertically as shown, may be arranged horizontally (such as in an overhead display or a table-type display), or at some offset angle from horizontal or vertical.

As shown, the display system 100 includes a controller 150 that is adapted to provide first or foreground content (such as 2D video or the like) 169 to the foreground transparent display device 110 and also to provide second or background content (such as 2D video or the like) 179 to the background transparent display device 120. The display devices 110 and 120 are adapted to be emissive as well as transmissive of light, and, as a result, each displays imagery on the surfaces 112, 122, respectively, that emits light 114 from the first or foreground display device 110 and light 124, 126, and 127 from the second or background display device 120.

Significantly, both display devices 110, 120 (or at least the foreground display device 110) are chosen to be transparent (or capable of having transparent portions) display devices. In one embodiment, this is achieved through the use of tOLED devices for the display devices 110, 120 (or at least for foreground device 110 and any intermediary devices between this device 110 and the background or rearmost device 120). Depending on the foreground content 169 all or portions of the area of the display surface/plane 112 will range from transparent (e.g., clear to at least translucent to light) to translucent to opaque (or nearly so) to light.

As shown in FIG. 1, the foreground content 169 is chosen such that portions of the display element 110 are opaque (e.g., brightly illuminated portions such as white or bright colored content) while others are transparent (or at least translucent) to light (e.g., black content in the foreground content 169). This results in some of the light emitted from the display surface/plane 122 of the background transparent display element 120 being blocked as shown at 126, 127 by the opaque portions and some of the light emitted being passed through as shown at 124. Hence, the viewer 104 of the display devices 110, 120 perceives a 3D image 130 (without the need for special eyewear) as a concurrently received combination of the light 114, 124 from the two devices 110, 120, and the light 114 originates from plane/surface 112 and the light 124 originates from the plane/surface 122 (i.e., from two different depths and/or two spaced apart planes).

As shown, the display system 100 includes the controller 150 providing the two streams of content 169, 179 for playback/display to the viewer 104. The controller 150 includes a processor 152 managing operations of input/output (I/O) devices 154, such as a keyboard, a monitor, a mouse, a touchscreen/pad, and/or the like to allow a user of the system 100 to initiate operations of the display devices 110, 120, to select content 169, 179, and so on. The controller's processor 152 executes code or runs a software program 156 to provide the control features for the display system 100, which may include defining which content 169, 179 to provide to the display devices 110, 120, the timing of playing such content, the timing of switching to new content, and so on. In this embodiment, the program 156 controls delivery of the display content 169, 179, but it does not generate or modify the content such as based on interactivity as is provided in other embodiments of the present description (see the table display system discussed below).

However, the interactivity assembly described for other display systems may also be included in the system 100 in some embodiments.

The controller 150 is also shown to include memory 160 (or to be able to access such memory or content such as via a wired or wireless digital communications network) that is managed by (or accessed by) the processor 152. The memory 160 is shown to store foreground content/media 162 and background content/media 170 for use in delivering content 169, 179 to the display devices 110, 120. The foreground content 162 includes bright content 164 and dark/black content 168 as well as content 166 with a brightness between these two contents 164, 168. The display device 110 may take the form of a tOLED display device, and tOLEDs are configured to be opaque when displaying bright content 164 (such as white or bright colors), to be transparent when displaying the black content 168, and to be translucent when displaying less bright content 166. The background content 170 also includes bright content 172, intermediate brightness content 174, and black/dark content 176.

In an exemplary operation, the foreground content/media 162 may provide the bright content 164 in the content 169 delivered to the foreground transparent display device 120 that includes objects/characters that the display designer wants to be perceived by the viewer 104 as being on/in the foreground/first plane 112. The display 110 will be opaque in these areas/locations such that any background content 179 provided by the second display device 120 will be blocked from view in the perceived 3D image 130. This effect may be further enhanced by mapping black content 176 in the background content/media 170 to this bright foreground content 164. In contrast, bright content 172 may include objects/characters in the background content 179 that the display designer wants to appear to be located in/on the background/second plane 122 to the viewer 104 in the perceived 3D image 130, and this effect is provided by mapping black content 168 in the foreground content 169 to the bright content 172 in the background content 179 so that there is a clear/transparent viewing window/portal (or area) in the foreground display device 110 allowing viewing of the background content 179 at these locations. In some embodiments, the displays 110, 120 are similarly sized tOLED display devices that are aligned with each other to be parallel and with their central axes coinciding (or lines passing through their corners coinciding and/or being orthogonal), which facilitates mapping of pixels in one display device 110 with the other display device 120.

Differing display effects may be achieved through the use of intermediate brightness content 166 in the foreground content 169 and/or intermediate brightness content 174 in the background content 179. For example, an area or window through the foreground display device 110 may be provided by including a plurality of pixels of intermediate brightness content 166 in the foreground content 169, and this viewing area/window will be translucent to light 124 from the background display device 120, which may all bright content 172 and, in some cases, intermediate brightness content 174 to be visible in the displayed background content 179. This background imagery, though, would not be as readily visible as if viewed through a transparent/clear viewing window provided by an area of pixels associated with black content 176 (but this may be useful for many visual effects where a foreground object/character is preferably not fully opaque to light from a background plane/source).

Figure 2A:
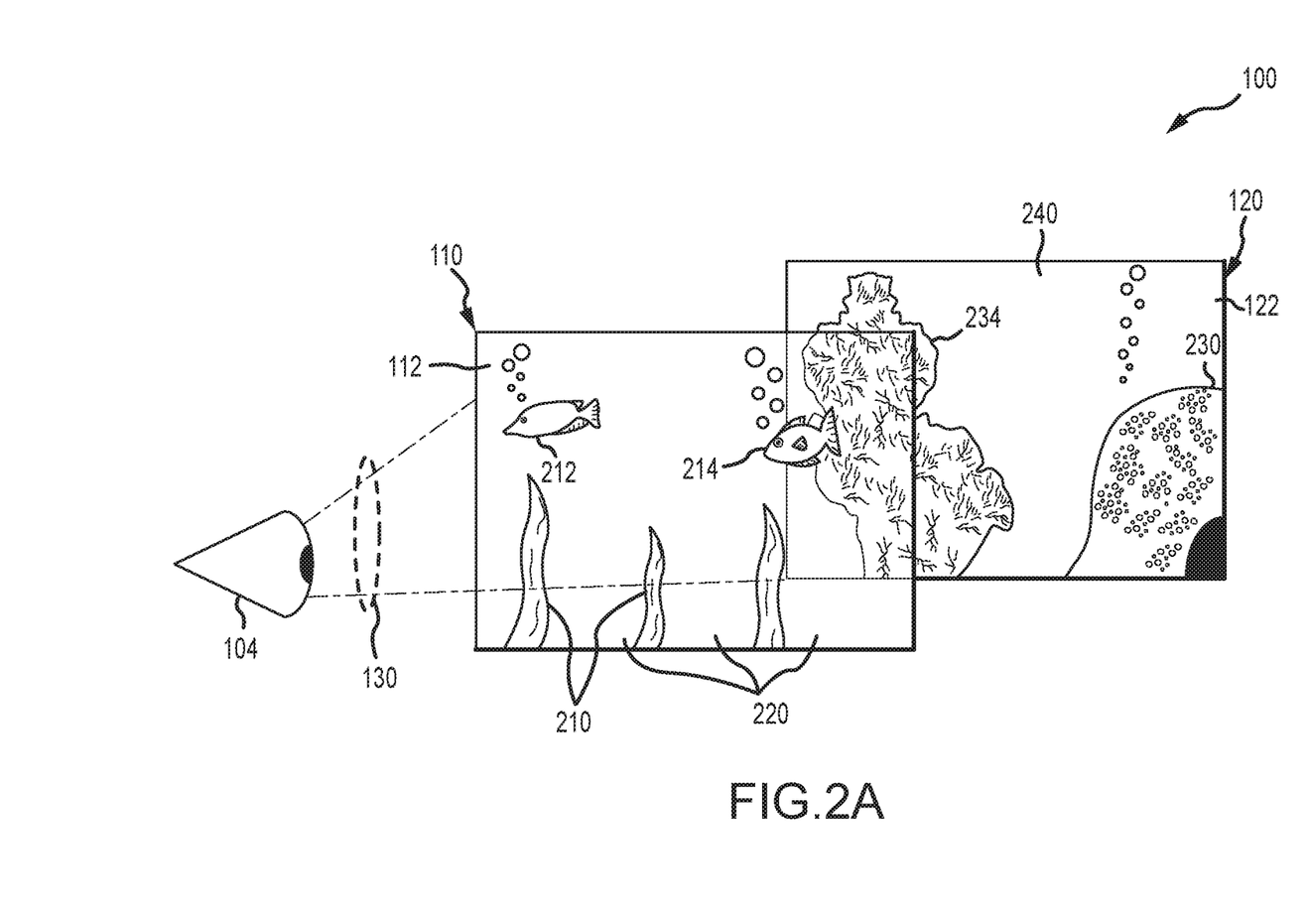
FIGS. 2A-2C schematically illustrate the multiplane display system of FIG. 1 during operations to display 2D content and showing a plane jumping or depth changing display technique in which 2D content is handed off from foreground display device to background display device by a controller to enhance the 3D or depth and space illusion achieved by the multiplane display system.
Figure 2B:
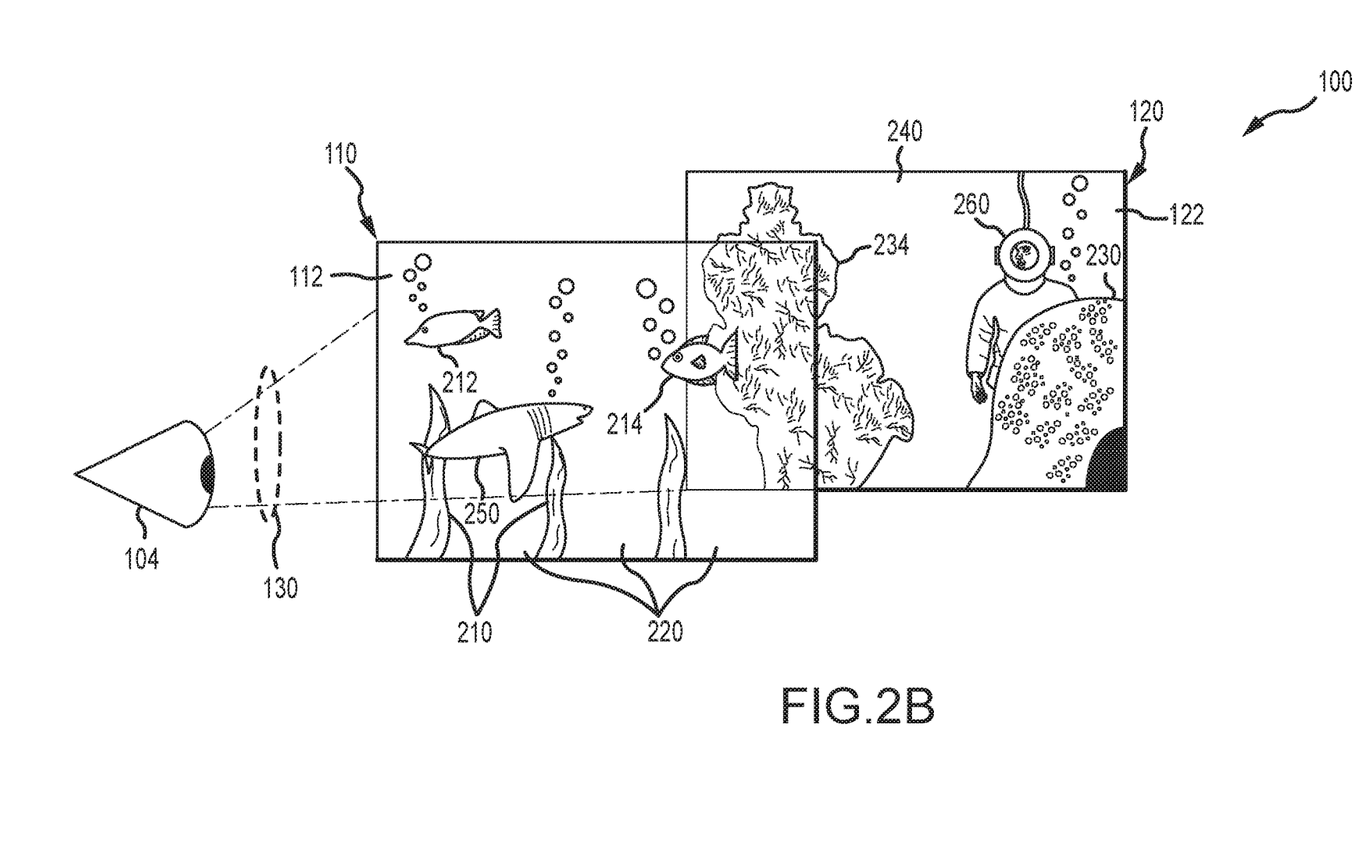
Figure 2C:
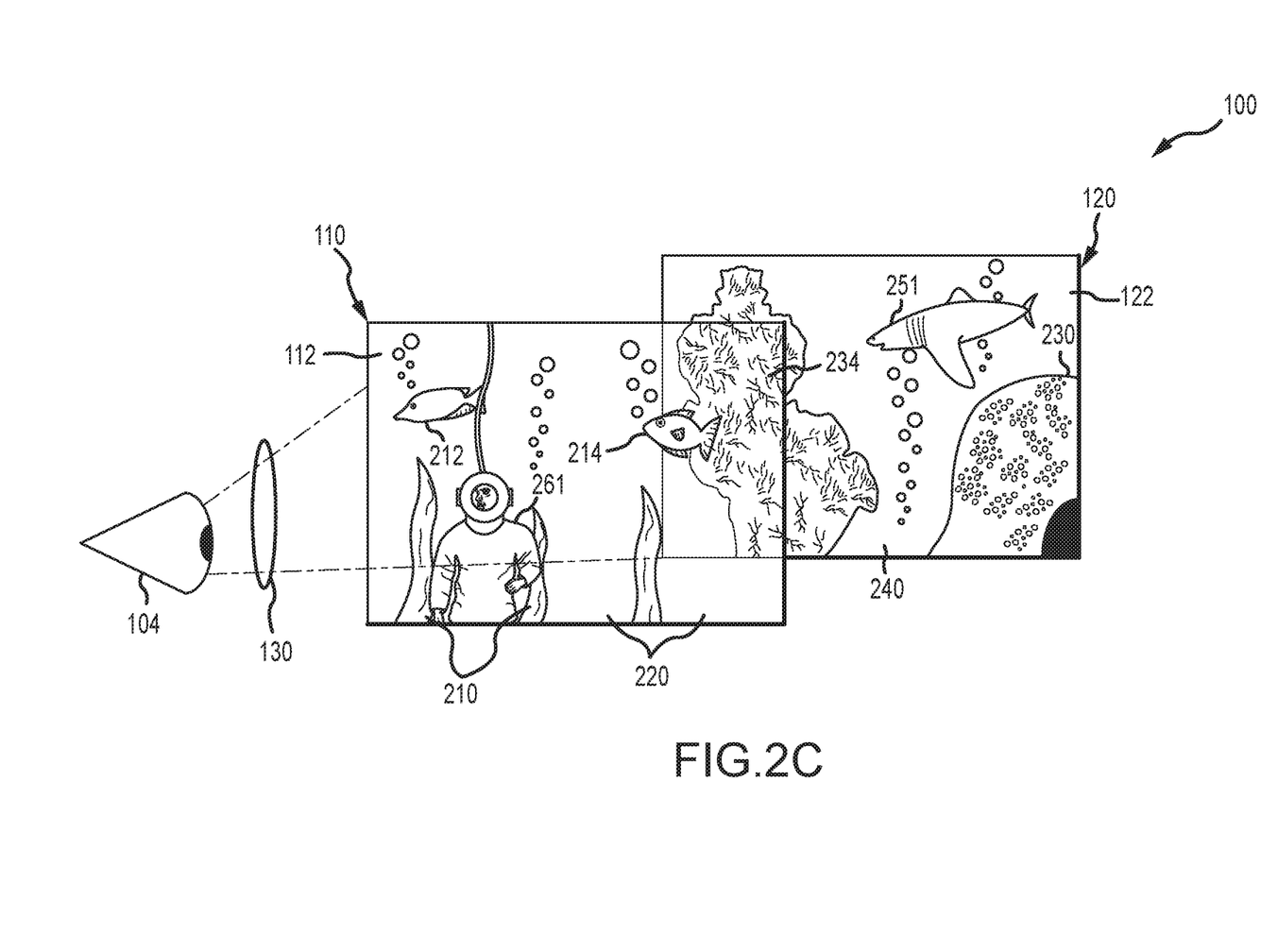

To facilitate understanding of the unique aspects of the display system 100, it may be useful to describe its operations to provide a 3D or multiplane display. FIGS. 2A-2C schematically illustrate the multiplane display system 100 of FIG. 1 during operations to display 2D content in two spaced apart planes to provide a 3D illusion. These three operating states or times also show a plane jumping or depth changing display technique in which 2D content is handed off from foreground display device 110 to background display device 120 (and vice versa) by a controller 150 to enhance the 3D or depth and space illusion achieved by the multiplane display system 100.

In the first operating mode (or first operating time) of FIG. 2A, the controller 150 is providing a first set (e.g., a frame of a video) of foreground content 169 to the first or foreground display device 120 (e.g., a tOLED proximate to a viewer 104 or facing a viewing space). As shown, the tOLED or other transmissive transparent display 110 operates to provide bright (or at least intermediately bright or not black) content (e.g., 2D video or animation) in the form of characters/objects 210, 212, and 214. The areas or portions of the planar display screen 112 associated with these characters/object 210, 212, 214 are opaque (or at least only slightly translucent) to light. Concurrently, the tOLED or other transmissive transparent display 120 operates to provide objects/characters 230, 234 with bright/white content and background scenery or shading in areas 240 such as with intermediate brightness content or black content. Since the background plane/surface 122 is a distance behind the foreground plane/surface 112, the viewer 104 perceives, via light 130, displayed images/objects 210, 212, 214 in the first plane/surface 112 and also objects/images 230, 234 and background scenery/images 240 on second plane/surface 122 via transparent viewing windows/portals 220 provided by the foreground display system 210 where black content is being displayed (areas outside the bright/white content of objects/characters 210, 212, 214), such that a 3D or multiplane display is achieved.

In the second operating mode (or second operating time) of FIG. 2B, the controller 150 is providing a second set (e.g., a later frame of a video) of foreground content 169 to the first or foreground display device 120 (e.g., a tOLED proximate to a viewer 104 or facing a viewing space). As shown, the tOLED or other transmissive transparent display 110 operates to provide bright content in the form of characters/objects 210, 212, and 214 and now also 250. The areas or portions of the planar display screen 112 associated with these characters/object 210, 212, 214, and 250 are opaque (or at least only slightly translucent) to light. Concurrently, the tOLED or other transmissive transparent display 120 operates to provide objects/characters 230, 234 and now also object/character 260 with bright/white content and background scenery or shading in areas 240 such as with intermediate brightness content or black content. Since the background plane/surface 122 is a distance behind the foreground plane/surface 112, the viewer 104 perceives, via light 130, displayed images/objects 210, 212, 214, 250 in the first plane/surface 112 and also objects/images 230, 234, 260 and background scenery/images 240 in the second plane/surface 122 via transparent viewing windows/portals 220 provided by the foreground display system 210 where black content is being displayed (areas outside the bright/white content of objects/characters 210, 212, 214, 250).

In the third operating mode (or third operating time) of FIG. 2C, the controller 150 is providing a third set (e.g., an additional later frame of a video) of foreground content 169 to the first or foreground display device 120 (e.g., a tOLED proximate to a viewer 104 or facing a viewing space). As shown, the tOLED or other transmissive transparent display 110 operates to provide bright content in the form of characters/objects 210, 212, and 214 and now also 261, which has moved forward from the background surface 122 (but no longer object 250). The areas or portions of the planar display screen 112 associated with these characters/object 210, 212, 214, and 261 are opaque (or at least only slightly translucent) to light. Concurrently, the tOLED or other transmissive transparent display 120 operates to provide objects/characters 230, 234 and now also object/character 251, which has moved backward from the foreground surface 112 (but no longer object 260) with bright/white content and background scenery or shading in areas 240 such as with intermediate brightness content or black content. Since the background plane/surface 122 is a distance behind the foreground plane/surface 112, the viewer 104 perceives, via light 130, displayed images/objects 210, 212, 214, 261 in the first plane/surface 112 and also objects/images 230, 234, 251 and background scenery/images 240 in the second plane/surface 122 via transparent viewing windows/portals 220 provided by the foreground display system 210 where black content is being displayed (areas outside the bright/white content of objects/characters 210, 212, 214, 261).

Figure 3:
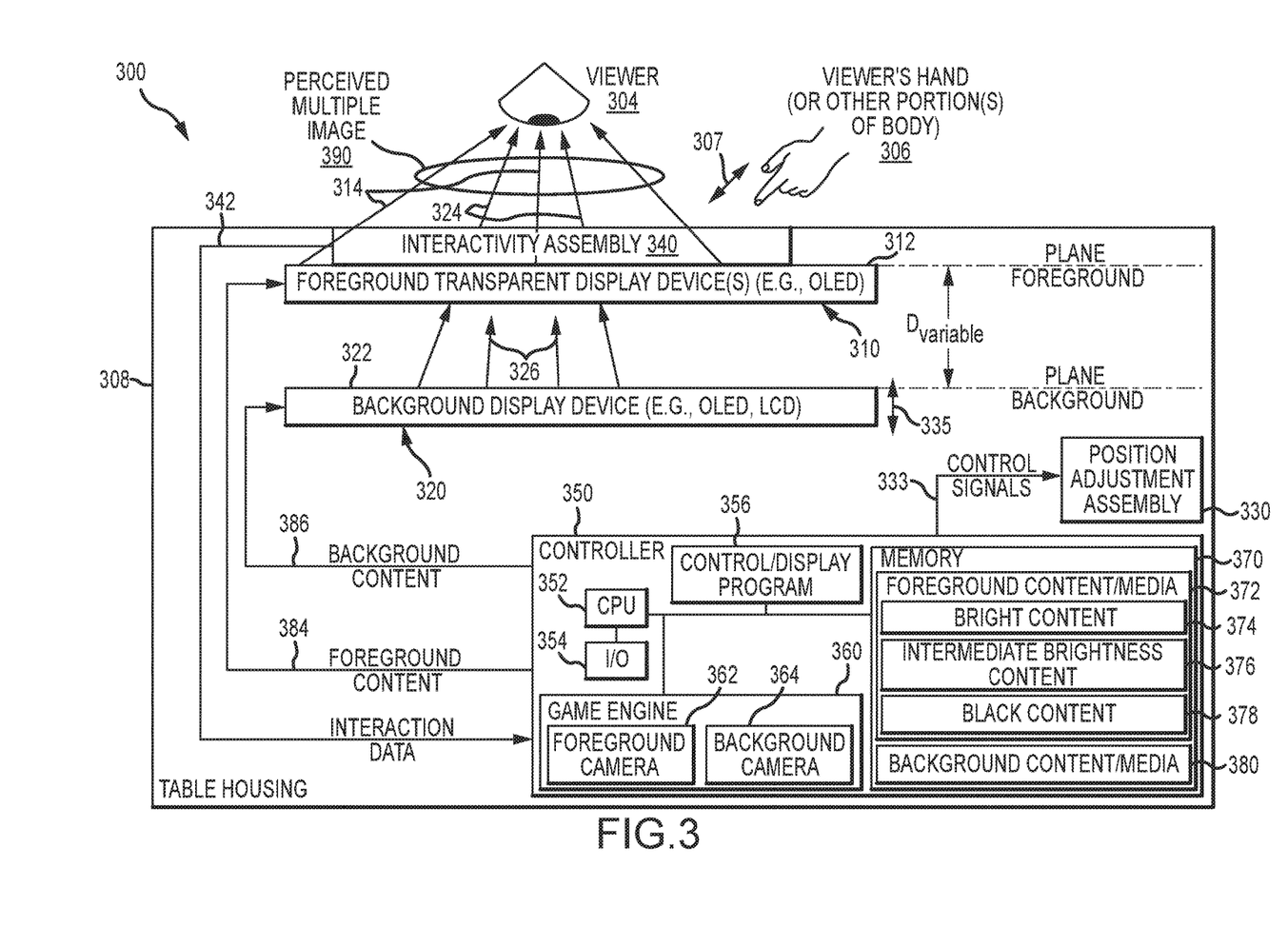
FIG. 3 is a functional block diagram of a table (or tabletop) display system making use of transparent display devices according to the present description to achieve a multiplane or 3D display.

In some embodiments, it may be desirable to provide interactivity within the display system while still utilizing one, two, three, or more transparent transmissive display devices. The specific configuration is not limiting and may involve vertical or horizontal orientations for the display devices (or their display screens) and, thus, the image display planes. The inventors, though, designed and built a prototype display system as a table or table top configuration. Particularly, FIG. 3 is a functional block diagram of a table (or tabletop) display system 300 making use of transparent display devices according to the present description to achieve a multiplane or 3D display as shown with a viewer 304 perceiving at 390 a multiplane or 3D image made up of light 314 from a foreground transparent display device and also light 324 from a background display device 320, which passes through the transparent and/or translucent portions or areas (e.g., a transparent viewing window or portal) in the foreground transparent display device 310. Light 326 from the background display device 320 is blocked (not in the perceived 3D image 390) when it strikes opaque areas/portions of the foreground transparent display device 310 (e.g., device 310 is opaque or less transmissive of light where it is operating to display bright content (e.g., foreground objects/characters in the foreground content 384)).

As shown, the display system 300 includes a table housing or frame 308 providing walls, shelving, an upper frame, a base, and the like for physically supporting and enclosing (hiding) the other components of the display system 300. A foreground transparent display device 310 is oriented horizontally within the table housing 308 with its display surface/screen 312 facing upward such as into a viewing space above the table housing 308 where a viewer 304 may be located. In some embodiments, the display surface/screen 312 is proximate to (less than an inch to several inches from) the top surface of the table housing 308 or even provides this top surface (e.g., can be touched 307 by the viewer 304 with their hand 306 or the like). The foreground transparent display device 310 may take the form of a tOLED display device that is operated by the controller 350 to display foreground content 384. Black (dark) content results in transparent pixels or areas on the screen/surface 312 while bright and brighter content results in opaque and cloudy/translucent pixels or areas on the screen/surface 312 (e.g., blocking all or a fraction of the light from background display device 320 (and from the exterior sources)). One foreground transparent display device 310 is shown in FIG. 3, but two, three, or more may be utilized (and typically will be spaced apart from each other some predefined distance to provide depth in multiple planes) in the display system 300.

The display system 300 further includes a background display device 320 that is spaced apart a distance, $D_{Variable}$, from the foreground device 310, which is measured from the display surface/screen 322 of the background display device 320 to the display surface/screen 312 of the foreground device 310. The display surface 312, 322 are arranged to be parallel to each other in most embodiments and may be similar in shape and size with the foreground surface/screen 312 wholly overlaying the background surface screen 322. In one prototype two 55-inch screens were utilized.

The distance, $D_{Variable}$, may be fixed or may be varied (e.g., from 1 inch separation to 18 inches or anywhere in between) during the operation of the display system 300 by the controller 350 transmitting control signals 333 to a position adjustment assembly 330, which is configured to raise and lower 335 the background display device 320 to reposition the screen/surface 322 relative to the foreground screen/surface 312. This causes the depth of the displayed multiplane image 390 to vary over time (such as in response to user input 307 from the viewer 304 or to achieve a desired visual effect with content moving toward or away from the viewer 304).

The display device 320 may be chosen to be transparent like device 310 or it may in some embodiments be a conventional display device such as an OLED device, an LCD device, or the like because there are no other displays provided behind the background display device 320 (i.e., no content has to pass through the device 320 for viewing by the viewer 304). During operations of the system 300, the controller 350 provides background content/media (e.g., 2D video/animation) 386, and the display device 320 operates to display imagery on its display surface/screen 322, which causes light 324, 326 to be emitted toward foreground device 310. Light 324 passes through the transparent areas/regions of the display device 310 (where black content is presented via a tOLED) while light 326 is blocked (or at least partially blocked) by opaque (or less translucent) areas/regions of the display device 310 (where bright (or brighter than black) content is presented via sets of pixels of a tOLED).

The display system 300 includes an interactivity assembly 340 that provides interaction data 342 to the controller 350 for processing (such as with a game engine 360) to select, modify, and/or generate foreground content/media 372 and/or background content media 380 for use in streaming content 384, 386 to the foreground and background devices 310, 320. For example, the table display system 300 may be configured as a video game that includes one or more user interface (game controller, which may be handheld, may sense motion 307 of the viewer's body/hand 306, a touchscreen, or the like) in the interactivity assembly 340 to sense user input 307 from the viewer 304 (such as via their hand 306 or the like). Such a video game-type system 300 may generate visual feedback to this input (interaction data 342) by generating (or selecting or modifying) foreground and/or background content 370, 380 streamed to the foreground and background display devices 310, 320 as shown at 384, 386. To this end, the interactivity assembly 340 may include the software and hardware to provide such video game-type interactivity as is well known by those skilled in the gaming industry, and this may include a game engine 360 provided in the assembly 340 or as part of the display controller 350.

The interactivity assembly 340 may utilize nearly any type of user interface-technology to collect the interaction data 342. For example, the assembly 340 may include a touchscreen positioned over or near the screen/surface 312 of the foreground display device 310 and supported by the table housing 310. Touchscreens are common in devices such as game consoles, personal computers, tablet computers, and smartphones, and any readily available (or off-the-shelf) touchscreen technology may be used to implement the interactivity assembly 340 to allow the user/viewer 304 via their hand or the like 306 provide input or control 307 to affect the content displayed on the devices 310, 320. The interaction in such cases may involve simple or multi-touch gestures input (and then sensed by the assembly 340) by touching 307 the screen with one or more fingers or a tool (e.g., a stylus, pen, or the like).

In the same or other embodiments, the interactivity assembly 340 is configured as or includes one or more of the following user interface types: direct manipulation interface; graphical user interface (GUI); command line interfaces; touch user interface (which may include haptic feedback in addition to visual feedback with the content 384, 386); hardware interfaces (such as knobs, buttons, sliders, switches, touchscreens, and the like); conversational or voice interfaces (which may include interface agents displayed in the content 384 and/or 386 that converse with the user 304); gesture interfaces (accepting input in the form of hand/body gestures 307 or accepting mouse or stylus gestures); holographic user interfaces; motion tracking interfaces; and other screen interfaces besides the screens on the table 310 (which may include touchscreens, GUIs, and so on).

The controller 350 includes one or more processors 352 that manage/control I/O devices 354 to allow an operator of the system 300 to provide input. For example, the operator of the system 300 may interact with user interfaces 354 to select one or more displays to be provided via operation of a control/display program 356 run/executed by the processor (s) 352. Based on this user input, the display program 356 may act to retrieve from memory 370 (which may also be located remote from the table housing 310 as may the controller 350 itself in some embodiments) particular foreground content/media 370 and background content/media 380 for use in streaming/delivering content 384, 386 to the foreground and background display devices 310, 320.

To provide interactivity and real-time content generation/modification, the controller 350 is shown to run/execute code/software to provide a game engine 360. The game engine 360 includes a first or foreground camera 362 and a second or background camera 364, which are software modules/tools that are used to generate video content from particular points of view (POVs) that can be set by an operator of the system 300. Particularly, the first camera 362 has its clipping plane and/or other settings/parameters defined so that it is useful for generating foreground content/media 372 from a predefined/generated set of display (or game) content (a virtual or digital world for a particular interactive game or display experience), and the second camera 364 has its clipping plane and/or other settings/parameters defined so that is useful for generating background content/media 380 from the predefined/generated set of display (or game) content. The game engine 360 with its two cameras 362, 364 is useful for generating or modifying the content 372, 380 based on interaction data 342 collected or sensed by the interactivity assembly 340 (e.g., to open/close a viewing port/window in the foreground display device 310 to allow content displayed on the background display device screen 322 to be visible (or more so), to move content off of the foreground display device screen 312, to move content between the two display devices screens 312, 322, and so on).

As shown, at any point during the operation of the display system 300, the display program 356 may retrieve foreground content/media 372 and provide it to the foreground display device 310 as shown at 384 while concurrently retrieving background content 380 to provide it to the background display device 320 as shown at 386. The foreground display device 310 may take the form of a tOLED display device, and the foreground content/media 372 may include bright content 374 (e.g., foreground objects/characters that are to be displayed for perception in the image 390 by the viewer 304 at the plane of the surface/screen 312), black content 376 that defined transparent viewing areas or windows/portals in the screen/surface 312 through which light 324 from the background display device's surface/screen 322 may pass to the viewer 304 in light 390 (to be part of the perceived 3D or multiplane image), and content 376 that is of a brightness level between these two sets of content 374, 378 such that it is displayed as translucent on the display screen/surface 312 (not wholly opaque and not transparent) so as to allow a fraction of the light 324 from the background display device 320 through to the viewer 304 (for perception in the image 390).

The background content/media 380 generated by the background camera 364 of the game engine 360 may be 2D video/animation content. The background display device 320 may take the form of a more conventional display device such as an OLED display device, an LCD display device, or the like. As a result, all content 380 generally results in light being emitted 324, 326 from the display screen/surface 322 and no light being transmitted through transparent or translucent portions or areas as is the case for the foreground transparent display 310. However, the content 380 is "mapped" to or aligned with areas or portions of the display screen/surface 312 of the foreground display device 310 as the result of use of the two cameras 362, 364 and their settings relative to each other (e.g., to generate imagery within a virtual world from two spaced apart but parallel clipping planes or the like). During operations, the position of the background camera 364 may be moved or adjusted concurrently with operations of the position adjustment assembly 330 to move 335 the screen/surface 322 of the background display device 320 (e.g., to have the content 380 generated by the background camera 364 suit the new distance, $D_{Variable}$, between the two display surfaces/screens 312, 322).

Figure 4A:
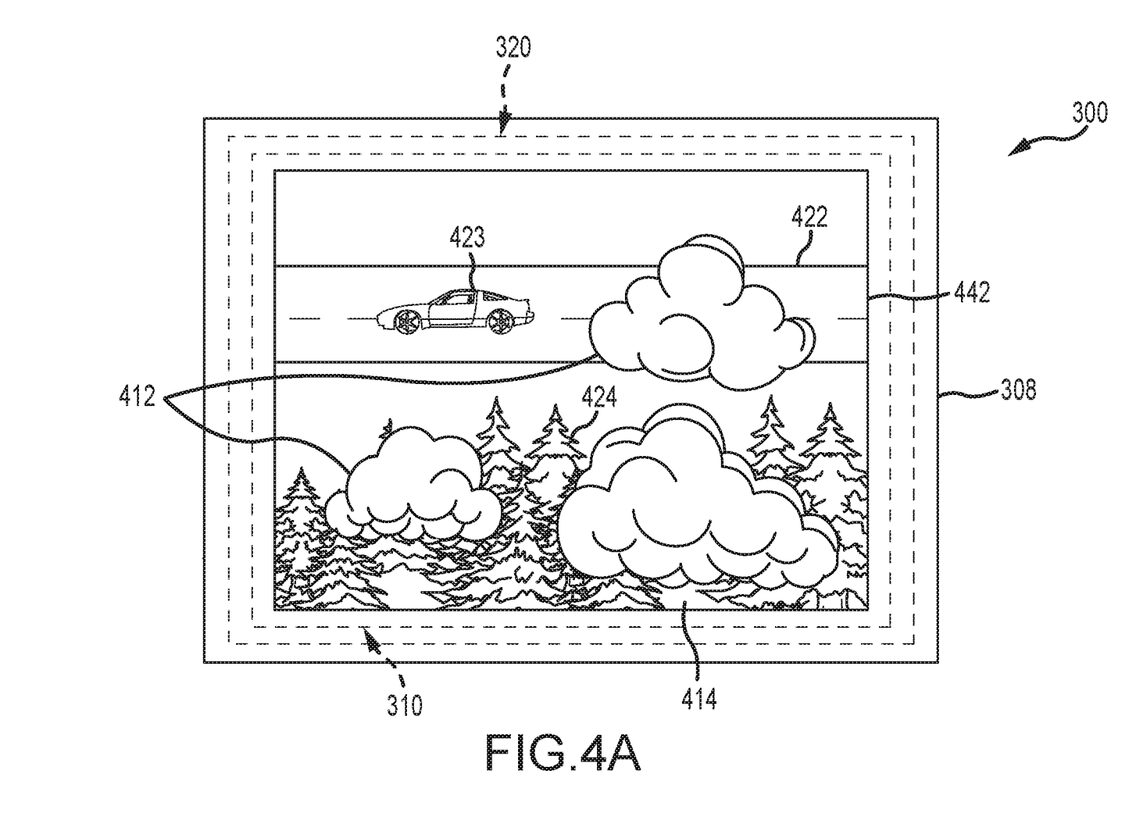
FIGS. 4A and 4B illustrate a top view of one implementation of the table display system of FIG. 3 during two states of operation illustrating modification of displayed content on a foreground plane (e.g., to open a transparent viewing window/portal to the underlying plane(s)).
Figure 4B:
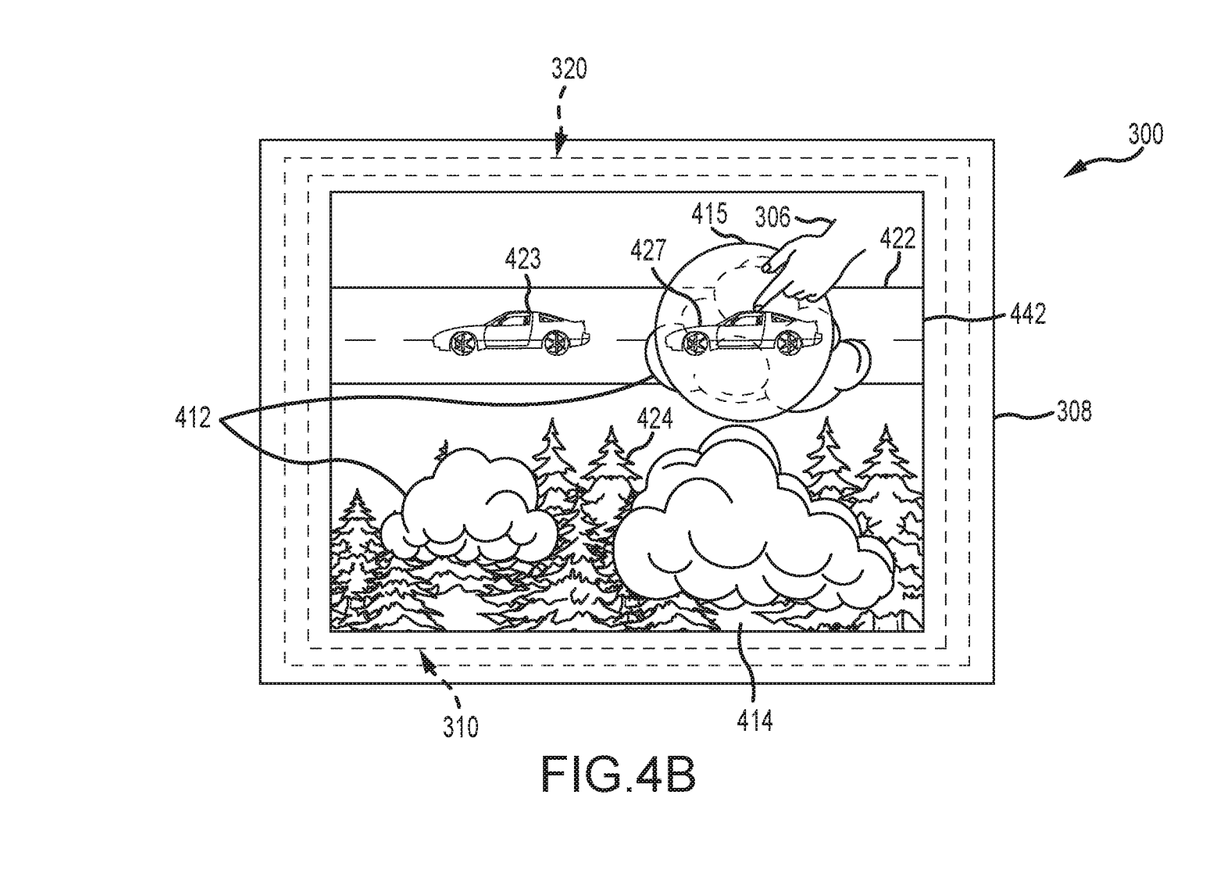

FIGS. 4A and 4B illustrate a top view of one implementation of the table display system 300 of FIG. 3 during two states of operation illustrating modification of displayed content on a foreground plane, e.g., to open a transparent viewing window/portal to the underlying plane(s). As shown, the display system includes a rectangular table housing or frame 308, and the interactivity assembly 340 includes a touchscreen 442. The touchscreen 442 is transparent (or substantially transparent) to light so as to allow light from the foreground display device 310 and background display device 320 to be perceived by a viewer (not shown in FIG. 4A but understood to be perceiving the table display system 300 as it is illustrated).

In FIG. 4A, the display system 300 is being operated in a first operating mode (or during a first operating time). As shown, the foreground transparent display device 310 is being operated to display a first set of foreground content that includes clouds 412, which coincide with or are areas or regions of bright content where the display device 310 is opaque such that content displayed on the background display device 320 is hidden to the viewer.

Significantly, the first set of foreground content also includes black content which produces transparent areas or viewing windows/portals 414 through which the screen/surface of the background display device 320 can be observed by viewer. As shown in FIG. 4A, the background display device 320 is being concurrently operated to display a set of background content including a road 422, a vehicle 423, and a mountain/background scenery 424, and this content 422, 423, 424 is visible through the transparent windows 414 but is blocked by the opaque regions/areas associated with foreground objects 412. Since the two sets of content 412, 422, 423, 424 are concurrently visible on two different and spaced apart physical surfaces or planes, the display system 300 is operating to effectively present a multiplane or 3D display (3D imagery) without the need for special eyewear.

In FIG. 4B, the viewer has moved there hand 306 so as to cause one or more fingers to contact the touchscreen 442. The interactivity assembly 340 senses this touch and its location and transmits interaction data 342 to the controller 350 (see FIG. 3). The display program 356, in response, causes the game engine 360 to modify the foreground content 372 and transmits new foreground content 384 to the foreground transparent display device 310. In this non-limiting example, the new foreground content 384 causes a viewing window/portal 415 to be opened or generated in the foreground display device 310 so that additional or new content can be seen on the plane/display surface of the background display device 320 in the form for more of the road 422 and an additional vehicle 427. This is achieved by inserting a circular area of black (or dark) pixels into the foreground content 384 to provide the transparent viewing window/portal 415. This is just one useful example of interactivity that can be provided by the display system 300, and those skilled in the art will recognize that the display effects that can be achieved with a multiplane display are nearly endless (e.g., move content between Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

For example, some embodiments of the multiplane display system include an interactivity assembly that includes at least one camera (e.g., located behind a backplane and directed/oriented for capturing light reflected off of a user (e.g., a user's face, hands/fingers, and/or body) that passes through the foreground display device (e.g., a tOLED or the like)) capturing images of a user of the apparatus. Then, the interactivity assembly is adapted (e.g., with software and/or hardware) to sense the user interaction by processing the images of the user to identify the user via facial recognition, to sense touch interaction with a screen of the foreground display device, or to sense hover interaction with the apparatus. This camera-based sensing of user interaction may trigger changes in the media displayed such as by causing additional media to be rendered or triggering the opening of a viewing window through the foreground display device (as discussed above). In some cases, facial recognition processes are implemented to not only identify/track the user but to also detect/sense the user's emotion and/or eye movement (or where the user's eyes are directed), and the detected user's emotion and/or eye movement is used to trigger playback of particular media or to cause new/different media to be rendered (or to cause the media such as a video presently being displayed to be modified).

For the interactive assembly, the display system can be designed to take advantage of the space which can be made available between the two or more screens in terms of sensing. For example, the interactive assembly can include a camera that is used as a touch sensor, but, further, the image processing may be performed (by software/hardware) to capture the optical recognition of fiducials or other recognizable symbols, barcodes and patterns from the camera. The camera(s) may be installed to be looking up from within the space between the top two screens in some embodiments. In this way, the interactive assembly can operate not only to sense physical objects placed upon it but also (or instead) by looking at patterns on the bottoms of the objects. The image processing may be further adapted to allow the interactive assembly to understand the locations and orientations of objects placed on (or near) the screen. This processed data can then be sent to the game logic and used to control the render on the top screen and/or the related screens below.

In some embodiments, the display system is configured to provide merging of the two-dimensional photonic illusions with physical objects, models, and sets, which are placed on, in between, or below the screens. For instance, there might be an illusion with two screens (which are both transparent screens as discussed herein), and underneath those screens is provided a three-dimensional, physical model, visible to the viewers/users through the transparent display screen. In another example, the top layer might be used to display a thin layer of translucent clouds, and sitting atop the second (lower/inner) screen is a small model of an island (a physical prop or the like). The media displayed on the lower screen looks like waves lapping against the model or physical island, and, as a result, all three of these layers create a very convincing 3D illusion.

One skilled in the art will recognize based on this description that it would also be simple to extend the described multiplane display system to include an enhancement which blends the photonic illusions with a Pepper's Ghost illusion, installed below the bottom video plane. Similarly, there are exciting effects that can be created by placing mirrors below the bottom video plane. Further, a system designer will now have the opportunity in certain circumstances to take full use of the space between the screens. For example, one can readily imagine a multiplane display system with a clear plastic or glass tank between the top and bottom screens, and this tank might hold transparent liquid (e.g., a glycol). Based on the game logic of the display system, a physical agitator included in the display system could cause turbulence in the glycol or other liquid, making it realistically appear that the user is viewing and/or interacting with objects submerged under water. Similarly, the space between the display system screens can be filled with visible gases to create other effects and illusions. With user-controlled, directional lighting under the top screen, a beam of light passing through these visible gases or particulate can further connect the virtual objects on the top layer to the objects on the layers below.

We claim:

1. An apparatus for providing a multiplane display, comprising:

a foreground display device with a display screen;

a background display device with a display screen spaced-apart a distance from the display screen of the foreground display device;

an interactivity assembly sensing user interaction with the apparatus; and a controller operating the foreground display device to display foreground content on the display screen of the foreground display device and concurrently operating the background display device to display background content on the display screen of the background display device, wherein the display screen of the foreground display device is emissive to provide light displaying the foreground content, whereby the background display device is not serving as a backlight for the foreground display device, wherein at least one of the foreground content and the background content is selected, generated, or modified by the controller based on the sensed user interaction, wherein the display screen of the foreground display device includes at least one area that is transparent, whereby a viewing window is provided in the foreground display device for viewing a portion of the background content concurrently displayed on the display screen of the background display device, and wherein in response to the sensing of the user interaction the controller modifies a translucent to opaque region in the foreground content to create a transparent viewing window through which light from the display screen of the background display device passes through the foreground display device.

2. The apparatus of claim 1, wherein the foreground display device comprises a transparent organic light emitting diode (tOLED) display device.

3. The apparatus of claim 2, wherein the background display device comprises a tOLED display device, an OLED display device, or a liquid crystal display (LCD) device.

4. The apparatus of claim 2, wherein the at least one area that is transparent corresponds to a set of black content in the foreground content and wherein the foreground content further includes bright content generating one or more opaque areas on the display screen of the foreground display device.

5. The apparatus of claim 2, wherein the foreground content and the background content are generated by a game engine.

6. The apparatus of claim 5, wherein the game engine generates the foreground content using a first camera with a first point of view (POV) setting and generates the background content using a second camera with a second POV setting differing from the first POV setting and wherein the foreground content and the background content are both generated from a predefined or generated set of display or game content.

7. The apparatus of claim 1, wherein the interactivity assembly comprises a touchscreen positioned adjacent and parallel to the display screen of the foreground display device.

8. The apparatus of claim 1, wherein the display screens are planar and parallel and are spaced apart a distance in the range of 1 to 18 inches.

9. The apparatus of claim 8, further including a position adjustment assembly operating to adjust the distance that the display screens are spaced apart during the operating of the foreground and background display devices by the controller.

10. The apparatus of claim 1, wherein the interactivity assembly comprises at least one camera capturing images of a user of the apparatus and wherein the interactivity assembly is adapted to sense the user interaction by processing the images of the user to identify the user via facial recognition, to sense touch interaction with a screen of the foreground display device, or to sense hover interaction with the apparatus.

11. An apparatus for providing a multiplane display, comprising:

a foreground display device;

a background display device parallel to and spaced-apart a distance from the foreground display device;

a controller operating the foreground display device to display foreground content on the display screen of the foreground display device and operating the background display device to display background content on the display screen of the background display device, wherein the foreground display device, in response to displaying the foreground content, includes one or more regions that are at least translucent to light generated by the background display device to provide one or more windows in the foreground display device and concurrently one or more regions that are opaque, wherein the one or more regions that are at least translucent to light correspond to a set of black content in the foreground content, wherein the foreground content further includes bright content generating the one or more regions that are opaque, wherein the foreground content is generated using a first camera with a first point of view (POV) setting and the background content is generated using a second camera with a second POV setting differing from the first POV setting, and wherein the foreground content and the background content are both generated from a predefined or generated set of display or game content.

12. The apparatus of claim 11, wherein the foreground display device comprises a transparent organic light emitting diode (tOLED) display device.

13. The apparatus of claim 12, wherein the background display device comprises a tOLED display device, an OLED display device, or a liquid crystal display (LCD) device.

14. The apparatus of claim 11, further including a position adjustment assembly operating to adjust the distance between the foreground and background display devices.

15. An apparatus for providing a multiplane display, comprising:

a first display device operating to display first content as sets of opaque pixels and sets of transparent pixels;

a second display device, spaced-apart a distance from the first display device, operating to display second content as sets of opaque pixels and sets of transparent pixels; and a controller concurrently operating the first display device to display the first content and the second display device to the second content, wherein the first and second display devices each comprises a transparent organic light emitting diode (tOLED) display device, wherein the sets of transparent pixels each correspond to a set of black content, wherein the sets of opaque pixels each corresponds to a set of white or bright content, wherein black content in the second content is mapped to at least some of the sets of white or bright content in the first content and bright content in the second content is mapped to at least some of the sets of black content in the first content, wherein the first and second content is generated by a game engine that generates the foreground content using a first camera with a first point of view (POV) setting and generates the background content using a second camera with a second POV setting differing from the first POV setting, and wherein the foreground content and the background content are both generated from a predefined or generated set of display or game content.

16. The apparatus of claim 15, wherein the first and second content comprise 2D video.

* * * * *